United States Patent Office 3,718,477
Patented Feb. 27, 1973

3,718,477
SILVER HALIDE EMULSIONS CONTAINING HOLOPOLAR CYANINE DYES WITH URAZOLE NUCLEUS
Philip W. Jenkins, Rochester, N.Y., assignor to Eastman Kodak Company, Rochester, N.Y.
No Drawing. Filed Oct. 19, 1970, Ser. No. 82,076
Int. Cl. G03c 1/22
U.S. Cl. 96—140                        7 Claims

ABSTRACT OF THE DISCLOSURE

Novel polymethine dyes derived from certain urazole compounds are described. The dyes have utility as filter dyes and many of them are useful as spectral sensitizers for photographic silver halide emulsions. Anhydro-1-[2-(2-benzothiazolyl ethohydroxide)vinyl] - 4 - phenylurazole, anhydro - 1 - [4-(2-benzothiazolyl ethohydroxide)-1,3-butadienyl]-4-phenylurazole and anhydro - 1 - [2-(2-benzothiazolyl ethohydroxide)vinyl] - 4 - phenyldithiourazole, for example, are illustrative of the polymethine dye compounds.

---

This invention relates to novel polymethine dyes derived from certain urazole compounds and to photographic materials, such as photographic silver halide emulsions, for example, containing said dyes.

It is well known that urazole compounds reduce fog and function also as stabilizers in sensitized photographic silver halide emulsions. (See U.S. Pat. 3,287,135, patented Nov. 22, 1966, for example). They are also disclosed as halogen acceptors in photographic systems in U.S. Pat. 3,396,017, patented Aug. 6, 1968.

I have now found that certain urazole compounds disclosed herein give polymethine dyes that are excellent spectral sensitizers incorporating the valuable properties, just mentioned, of the urazole nucleus. The new dyes of my invention are not true merocyanine dyes because they do not contain the amidic system; rather they contain a cationic amidinium ion resonance system, wherein the charge is internally neutralized by, but not directly conjugated with, an anionic resonance system, and the undissociated dye molecules remain electronically neutral. For these reasons, the new dyes of my invention are regarded as holopolar cyanine dyes.

The new polymethine dyes of my invention have utility as filter dyes. Thus, for example, the magenta colored dyes absorb green light while the cyan colored dyes absorb red light.

It is, accordingly, an object of my invention to provide new polymethine dyes. Another object is to provide photographic silver halide emulsions spectrally sensitized with certain of the new polymethine dyes of the invention.

A further object is to provide novel photographic elements containing the new polymethine dyes of my invention. Another object is to provide methods for preparing the new dyes and novel photographic materials of my invention. Other objects will become apparent from a consideration of the general description and the appended claims.

The new polymethine dyes of my invention are represented by the following general formula:

$$R \pm N(=CH-CH)_{n-1} = \overset{\overset{\displaystyle Z}{\frown}}{C} - CH=CH(-CH=CH)_{m-1} - N \underset{\underset{X^-}{\overset{}{\diagdown}}}{\overset{\overset{X_1}{\|}}{\diagup}} N-R_1$$

wherein $n$ and $m$ each represents a positive integer of from 1 to 2; R represents an alkyl group having 1 to 18 carbon atoms, preferably a lower alkyl group containing from 1 to 4 carbon atoms, such as methyl, ethyl, propyl, isopropyl, butyl, pentyl, hexyl, heptyl, octyl, nonyl, decyl, undecyl, dodecyl, tridecyl, tetradecyl, pentadecyl, hexadecyl, heptadecyl and octadecyl, for example, a substituted alkyl group, preferably a substituted lower alkyl group, such as a hydroxyalkyl group having 2 to 4 carbon atoms such as $\beta$-hydroxyethyl, $\beta$-hydroxypropyl, $\gamma$-hydroxypropyl and $\omega$-hydroxybutyl, for example, an alkoxyalkyl group having 3 to 8 carbon atoms such as $\beta$-ethoxyethyl, $\beta$-ethoxyethyl, $\beta$-propoxyethyl, $\beta$-butoxyethyl, $\gamma$-methoxypropyl, $\gamma$-ethoxypropyl, $\gamma$-propoxypropyl, $\omega$-ethoxybutyl and $\omega$-butoxybutyl, for example, a carboxyalkyl group having 2 to 7 carbon atoms such as carboxymethyl, $\beta$-carboxyethyl, $\gamma$-carboxypropyl, $\omega$-carboxybutyl, $\omega$-carboxypentyl and $\omega$-carboxyhexyl for example, a sulfoalkyl group having 2 to 4 carbon atoms such as $\beta$-sulfoethyl, $\gamma$-sulfopropyl, $\gamma$-sulfobutyl and $\omega$-sulfobutyl, for example, a sulfatoalkyl group having 2 to 4 carbon atoms such as $\beta$-sulfatoethyl, $\gamma$-sulfatopropyl and $\omega$-sulfatobutyl, for example, an acyloxyalkyl group having 4 to 8 carbon atoms, such as $\beta$-acetoxyethyl, $\beta$-propionyloxyethyl, $\beta$-butyryloxyethyl, $\gamma$-acetoxypropyl, $\omega$-acetoxybutyl, $\omega$-propionyloxybutyl and $\omega$-butyryloxybutyl, for example, and an alkoxycarbonylalkyl group having 4 to 9 carbon atoms such as $\beta$-methoxcarbonylethyl $$\left( -CH_2CH_2\underset{\underset{O}{\|}}{C}-OCH_3 \right)$$

$\beta$-ethoxycarbonylethyl $\left( -CH_2CH_2\underset{\underset{O}{\|}}{C}-OC_2H_5 \right)$, $\gamma$-ethoxycarbonylpropyl, $\omega$-ethoxycarbonylbutyl and $\omega$-butoxycarbonylbutyl, for example, an alkenyl group having 3 to 4 carbon atoms such as allyl, 1-propenyl, 2-propenyl, 1-butenyl, 2-butenyl and 3-butenyl, for example, an aralkyl group such as benzyl, phenethyl and 3-phenylpropyl, for example, or a phenyl group such as phenyl, o-tolyl, m-tolyl, p-tolyl, xylyl, chlorophenyl, sulfophenyl, carboxyphenyl, alkoxyphenyl, such as methoxyphenyl and ethoxyphenyl, for example; $R_1$ represents an alkyl group having 1 to 18 carbon atoms, preferably an alkyl group having 1 to 4 carbon atoms, such as methyl, ethyl, propyl, isopropyl, butyl, pentyl, hexyl, heptyl, octyl, nonyl, decyl, undecyl, dodecyl, tridecyl, tetradecyl, pentadecyl, hexadecyl, heptadecyl and octadecyl, for example, an aralkyl group such as benzyl, phenethyl and 3-phenylpropyl, for example, or an aryl group such as phenyl, o-tolyl, m-tolyl, p-tolyl, xylyl, ethylphenyl, propylphenyl, butylphenyl, pentylphenyl, hexylphenyl, heptylphenyl, octylphenyl, and naphthyl, for example; $X^-$ and $X_1$ each represents an oxygen atom or a sulfur atom, and Z represents the non-metallic atoms required to complete a 5- to 6-membered heterocyclic nucleus such as those selected from the group consisting of a thiazole nucleus (e.g., thiazole, 4-methylthiazole, 4-phenylthiazole, 5-methylthiazole, 5-phenylthiazole, 4,5-dimethylthiazole, 4,5-diphenylthiazole, 4-(2-thienylthiazole, etc.), a benzothiazole nucleus, (e.g., benzothiazole, 4-chlorobenzothiazole, 5-chlorobenzothiazole, 6-chlorobenzothiazole 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5 - hydroxybenzothiazole, 6-hydroxybenzothiazole, etc.), a naphthothiazole nucleus, (e.g., $\alpha$-naphthothiazole, $\beta$-naphthothiazole, 5-methoxy- β-naphthothiazole, 5-ethoxy-β-naphthothiazole, 8-methoxy-α-naphthothiazole, 7-methoxy-α-naphthothiazole, etc.), a thionaphtheno-7',6',4,5-thiazole nucleus (e.g., 4'-methoxythianaphtheno-7',6',4,5-thiazole, etc.), an oxazole nucleus (e.g., 4-methyloxazole, 5-methyloxazole, 4-phenyloxazole, 4,5-diphenyloxazole, 4-ethyloxazole, 4,5-dimethyloxazole, 5-phenyloxazole, etc.), a benzoxazole nucleus (e.g., benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.), a naphthoxazole nucleus (e.g., α-naphthoxazole, β-naphthoxazole, etc.), a selenazole nucleus (e.g., 4-methylselenazole, 4-phenylselenazole, etc.), a benzoselenazole nucleus (e.g., benzoselenazole, 5-chlorobenzoselenazole, 5-methoxybenzoselenazole, 5-hydroxybenzoselenazole, tetrahydrobenzoselenazole, etc.), a naphthoselenazole nucleus (e.g., α-naphthoselenazole, β-naphthoselenazole, etc.), a thiazoline nucleus (e.g., thiazoline, 4-methylthiazoline, etc.), a 2-pyridine nucleus (e.g., 2-pyridine, 5-methyl-2-pyridine, etc.), a 4-pyridine nucleus (e.g., 4-pyridine, 3-methyl-4-pyridine, etc.), a 2-quinoline nucleus (e.g., 2-quinoline, 3-methyl-2-quinoline, 5-ethyl-2-quinoline, 6-chloro-2-quinoline, 8-ethoxy-2-quinoline, 8-hydroxy-2-quinoline, etc.), a 4-quinoline nucleus (e.g., 4-quinoline, 6-methoxy-4-quinoline, 7-methyl-4-quinoline, 8-chloro-4-quinoline, etc.), a 1-isoquinoline nucleus (e.g., 1-isoquinoline, 3,4-dihydro-1-isoquinoline, etc.), a 3-isoquinoline nucleus (e.g., 3-isoquinoline, etc.), a 3,3-dialkylindolenenine nucleus (e.g., 3,3-dimethylindolenine, 5- or 6-nitro-3,3-dimethyl- or 5- or 6-cyano-3,3-dimethylindolenines, 3,3,5-trimethylindolenine, 3,3,7-trimethylindolenine, etc.), an imidazole nucleus (e.g., imidazole, 1-alkylimidazole, 1-alkyl-4-phenylimidazole, 1-alkyl-4,5-dimethylimidazole, etc.), a benzimidazole nucleus (e.g., benzimidazole, 1-alkylbenzimidazole, 1-aryl-5,6-dichlorobenzimidazole, etc.), a naphthimidazole nucleus (e.g., 1-alkyl-β-naphthimidazole, 1-aryl-β-naphthimidazole, 1-alkyl-5-methoxy-α-naphthimidazole, etc.), etc. The dyes wherein $X^-$ and $X_1$ each represents an oxygen atom are especially useful in sensitizing photographic silver halide emulsions and are preferred.

The new polymethine dyes of the invention can be conveniently prepared by condensing a nitrogen heterocyclic compound of the general formula:

II.

$$R-\overset{+}{N}(=CH-CH)_{n-1}=C-CH=CH(-CH=CH)_{m-1}-NR_2R_3$$
$$\underset{X_2^-}{\underbrace{\phantom{XXXXXXXX}Z\phantom{XXXXXXXX}}}$$

wherein $m$, $n$, R and Z are as previously defined, $X_2^-$ represents an acid anion, e.g., chloride, bromide, iodide, thiocyanate, sulfamate, perchlorate, benzenesulfonate, p-toluenesulfonate, methyl sulfate, ethyl sulfate, etc., $R_2$ represents a hydrogen atom or an acyl group, e.g., acetyl, propionyl, butyryl, benzoyl, etc., and $R_3$ represents an aryl group, e.g., phenyl, tolyl, etc., with a urazole compound having the general formula:

III.

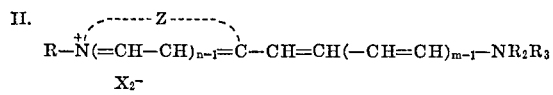

wherein X, $X_1$ and $R_1$ are as previously defined. The intermediate compounds represented by Formulas II and III hereinbefore, are well known substances, and methods for their preparation are well known to the art.

Advantageously, the condensation reactions for preparing the dyes of the invention are carried out in an inert solvent medium such as acetone, a lower alkanol such as ethanol, etc., and in the presence of a dehydrating agent such as acetic anhydride and a basic condensing agent such as a trialkylamine, e.g., triethylamine, tripropylamine, triisopropylamine, etc., N,N-dialkylanilines such as N,N-dimethylaniline, etc., N-alkylpiperidines such as N-methylpiperidine, etc., at elevated temperatures and preferably at refluxing temperatures of the reaction mixtures. On chilling, the dye compounds separate from the mixtures and are purified by one or more extractions or recrystallizations with appropriate solvents. The reactants can be employed with a small excess of one or the other, i.e., greater than the stoichiometrically calculated equivalents, but preferably in equimolar proportions of the compounds of Formulas I and II.

In a modified procedure, the polymethine dyes such as prepared by Example 1 to 4 herein, can be readily converted to the corresponding dithiourazole dyes of the invention by heating with phosphorus pentasulfide (See Example 5 herein).

Typical urazole compounds coming under Formula III that can be employed to prepare the new polymethine dyes of the invention include, for example, urazole, 4-methylurazole, 4-ethylurazole, 4-propylurazole, 4-butylurazole, 4-hexylurazole, 4-octylurazole, 4-decylurazole, 4-dodecylurazole, 4-tetradecylurazole, 4-hexadecylurazole, 4-octadecylurazole, 4-phenylurazole, 4-p-ethylphenylurazole, 4-p-propylphenylurazole, 4-p-butylphenylurazole, 4-p-hexylphenylurazole, 4-p-octylphenylurazole, 4-o- or p-tolylurazole, 3-thiourazole, 3,5-dithiourazole, 4-methyl-3-thiourazole, 4-phenyl-3-thiourazole, 4-methyl-3,5-dithiourazole, 4-phenyl-3,5-dithiourazole, 4-ethyl-3-thiourazole, and the like.

The following examples further illustrate the new polymethine dyes and novel photographic materials of the invention.

EXAMPLE 1

Anhydro-1-[2-(2-benzothiazolyl ethohydroxide) vinyl]urazole

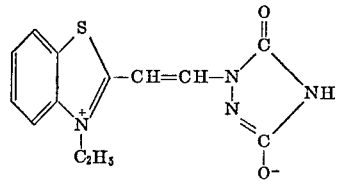

A mixture of urazole (2.00 g., 0.02 mole), 2-(2-acetanilidovinyl)-3-ethylbenzothiazolium iodide (9.00 g., 0.02 mole), triethylamine (2.00 g., 0.02 mole), and ethanol (50 ml.) was heated under reflux for fifteen minutes. The reaction mixture was filtered hot, and the precipitate was washed with ethanol and dried. After two recrystallizations from m-cresol and methanol containing triethylamine, the yield of pure dye was 4.86 g. (84%), M.P. 219.5–222.5° C. dec.

*Analysis.*—Calcd. for $C_{13}H_{12}N_4O_2S$ (percent): C, 54.2; H, 4.2; N, 19.4. Found (percent): C, 54.4; H, 4.2; N, 19.2.

EXAMPLE 2

Anhydro-1-[2-(2-benzothiazolyl ethohydroxide) vinyl]-4-phenylurazole

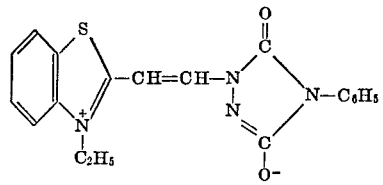

A mixture of 4-phenylurazole (1.80 g., 0.01 mole), 2-(2-acetanilidovinyl)-3-ethylbenzothiazolium iodide (4.50 g., 0.01 mole), triethylamine (1.00 g., 0.01 mole), and ethanol (25 ml.) was heated under reflux for twenty minutes. The mixture was filtered hot; the precipitate was washed thoroughly with ethanol and dried. After two recrystallizations from m-cresol and methanol containing triethylamine, the yield of pure dye was 1.00 g. (27%), M.P. 236.5–237.5° C. dec.

*Analysis.*—Calcd. for $C_{19}H_{16}N_4O_2S$ (percent): C, 62.6; H, 4.4. Found (percent): C, 62.4; H, 4.6.

EXAMPLE 3

Anhydro-1-[4-(2-benzothiazolyl ethohydroxide)-1,3-butadienyl]-4-phenylurazole

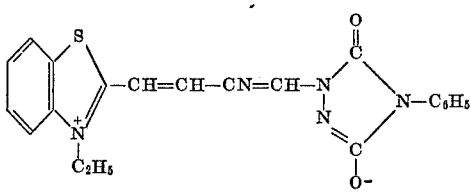

A mixture of 4-phenylurazole (3.60 g., 0.02 mole), 2-(4-acetanilido-1,3-butadienyl) - 3 - ethylbenzothiazolium iodide (9.60 g., 0.02 mole), triethylamine (3.00 g., 0.03 mole), and ethanol (50 ml.) was heated under reflux for ten minutes. The mixture was filtered hot, and after drying, the weight of crude product was 5.25 g. (67%). This material was boiled with six 75-ml. portions of methanol, filtering the mixture hot each time. The weight of methanol insoluble material remaining after this treatment was 4.20 g. (54%). Recrystallization of a 2.00 g. portion of this sample from m-cresol and methanol, gave 1.50 g. (40% corrected yield) of pure dye, M.P. 198.5–199.0° C. dec.

*Analysis.*—Calcd. for $C_{21}H_{18}N_4O_2S$ (percent): C, 64.6; H, 4.7; N, 14.4. Found (percent): C, 64.8; H, 4.7; N, 14.1.

EXAMPLE 4

Anhydro-1-[2-(2-quinolyl ethohydroxide)vinyl]-4-phenylurazole

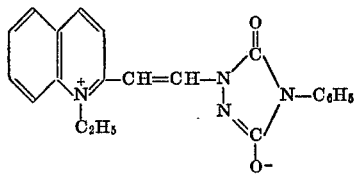

A mixture of 4-phenylurazole (1.80 g., 0.01 mole), 2-(2-acetanilidovinyl)-1-ethylquinolinium iodide (4.45 g., 0.01 mole), acetic anhydride (0.50 g., 0.005 mole), triethylamine (1.50 g., 0.015 mole), and ethanol (25 ml.) was heated under reflux for twenty minutes. The mixture was filtered hot; the precipitate was washed thoroughly with ethanol and dried. The crude product was boiled briefly with a mixture of pyridine (100 ml.) and water (10 ml.). The mixture was filtered hot and the insoluble material was dried. After one recrystallization of the aqueous pyridine insoluble material from m-cresol and methanol containing triethylamine followed by thorough washing of the precipitate with methanol, the yield of pure dye was 0.85 g. (24%), M.P. 254.0–255.0° C. dec.

*Analysis.*—Calcd. for $C_{21}H_{18}N_4O_2$ (percent): C, 70.4; H, 5.1. Found (percent): C, 70.7; H, 5.3.

EXAMPLE 5

Anhydro-1-[2-(2-benzothiazolyl ethohydroxide)vinyl]-4-phenyldithiourazole

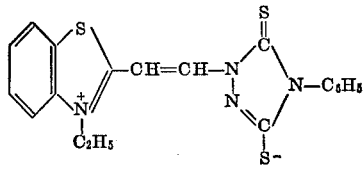

A mixture of anhydro-1-[2-(2-benzothiazolyl ethohydroxide)vinyl]-4-phenylurazole (7.30 g., 0.02 mole), phosphorus pentasulfide (4.45 g., 0.02 mole) and pyridine (25 ml.) was heated under reflux for 35 min. The mixture was transferred to a beaker, diluted with distilled water (150 ml.) and chilled overnight. The mixture was filtered and the precipitate was washed with water and dried. The crude product was boiled with methanol (75 ml.), filtered hot, and dried giving 5.95 g. (75%) of partially purified dye. A part of this material (1.00 g.) was extracted with a boiling mixture of pyridine (100 ml.) and distilled water (10 ml.) and filtered hot. The filtrate was diluted with methanol (500 ml.) and chilled. Collection of the precipitate by filtration followed by drying gave 0.181 g. (23% corrected) of purified dye, M.P. 194.0–196.0° C.

EXAMPLE 6

Anhydro-1-[2-(2-benzothiazolyl ethohydroxide)vinyl] -4-phenyl - 3 - thiourazole and anhydro-1-[2-(2-benzothiazolyl ethohydroxide)vinyl]-4-phenyl-5-thiourazole

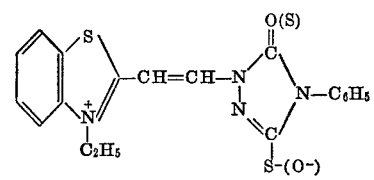

These dyes can be obtained in admixture by the substitutiton of 4-phenyl-3-thiourazole for the 4-phenylurazole in Example 2. The individual dyes can then be isolated by fractional recrystallization.

EXAMPLE 7

Anhydro-1-[2-(2-benzothiazolyl ethohydroxide vinyl]dithiourazole

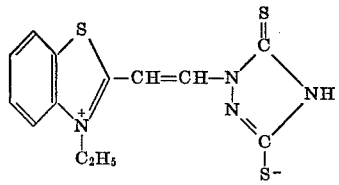

This dye can be prepared by the exact procedure of Example 1, by the substitution of dithiourazole for the urazole of Example 1.

Other polymethine dyes of the invention having generally similar photographic properties and applications can be prepared in accordance with the preceding examples by approriate selection of the reactants defined by Formulas II and III. For examle, 2-(2-acetanilidovinyl)-3-ethylbenzoxazolium salts with urazole give the dye compound anhydro-1-[2-(2-benzoxazolyl ethohydroxide)-vinyl]urazole; 2-(4-acetanilido-1,3-butadienyl )- 3 - ethylbenzoxolium salts with 4-phenylurazole give the dye compound anhydro-1-[4-(2-benzoxazolyl ethohydroxide)-1,3-butadienyl]-4-phenylurazole; 2 - (acetanilididovinyl)-3-butylbenzimidazolium salts with 4-phenylurazole give the dye compound anhydro-1-[2-(2-benzimidazolyl ethohydroxide)vinyl]-4-phenylurazole; etc.

The dyes listed in Table 1 below were tested in a silver bromoiodide emulsion containing 0.77 mole percent iodide of the type described by Trivelli and Smith, Phot. Journal, 79, 330 (1939). The dyes, dissolved in suitable solvents, were added to separate portions of the emulsions at the concentrations indicated. The emulsions were then coated at a coverage of 432 mg. silver/ft.$^2$ on a cellulose acetate film support. A sample of each coating was exposed on an Eastman IB Sensitometer and to wedge spectrograph, processed for three minutes in a developer of the following composition:

DEVELOPER

| | G. |
|---|---|
| N-methyl-p-aminophenol sulfate | 2.0 |
| Sodium sulfite (anhydrous) | 90.0 |
| Hydroquinone | 8.0 |
| Sodium carbonate (monohydrate) | 52.5 |
| Potassium bromide | 5.0 |
| Water to make 1.0 liter. | | and then fixed, washed and dried. The sensitizing values obtained are shown in the following Table 1.

TABLE 1

| Dye of Example No. | Dye conc., g./mole silver | Emulsion Sensitizing type | Sensitizing range (mu) | Sensitizing maximum (mu) |
|---|---|---|---|---|
| 2 | 0.08 | Bromoiodide | To 620 | 590. |
| 3 | 0.08 | do | To 725 | 555 and 695. |
| 5 | 0.09 | do | To 630 | 585. |

In the preparation of photographic emulsions, the new dyes of the invention are advantageously incorporated in the washed, finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which case the solvent selected should be completely free from any deleterious effect on the ultimate light-sensitive materials. Methanol, isopropanol, pyridine, etc., alone or in admixtures, have proven satisfactory as solvents for the majority of my new dyes. Other suitable solvents are known to those skilled in the art. The type of silver halide emulsions that can be sensitized with the new dyes include any of those prepared with hydrophilic colloids that are known to be satisfactory for dispersing silver halides, for example, emulsions comprising natural materials such as gelatin, albumin, agar-agar, gum arabic, alginic acid, etc. and hydrophilic synthetic resins such as polyvinyl alcohol, polyvinyl pyrrolidone, cellulose ethers, partially hydrolyzed cellulose acetate, and the like.

The concentration of the new dyes in the emulsion can vary widely, i.e., from about 5 to about 100 mgs. per liter of flowable emulsion. The specific concentration will vary according to the type of light-sensitive material in the emulsion and according to the effects desired. The suitable and most economical concentration for any given emulsion will be apparent to those skilled in the art upon making the tests and observations customarily used in the art of emulsion making.

To prepare a gelatino-silver halide emulsion sensitized with one of the new dyes, the following procedure is satisfactory: A quantity of the dye is dissolved in a suitable solvent and a volume of this solution containing from 5 to 100 mgs. of dye is slowly added to about 1000 cc. of a gelatino-silver halide emulsion. With most of the new dyes, 10 to 20 mgs. of dye per liter of emulsion suffice to produce the maximum sensitizing effect with the ordinary gelatino-silver halides including silver chloride, bromide, bromoiodide chlorobromide, chlorobromoiodide, etc. emulsions. With fine-grain emulsions, which include most of the ordinary employed gelatino-silver chloride emulsions and the like, somewhat larger concentrations of dye may be necessary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

The above statements are only illustrative and are not to be understood as limiting the invention in any sense, as it will be apparent that the new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. Patents to W. D. Baldsiefen 2,540,085, granted Feb. 6, 1951; R. E. Damschroder 2,597,856, granted May 27, 1952, and H. C. Yutzy, et al., 2,597,915, granted May 27, 1952), various palladium compounds, such as palladium chloride (W. D. Baldsiefen U.S. 2,540,086, granted Feb. 6, 1951), potassium chloropalladate (R. E. Stauffer, et al., U.S. 2,598,079, granted May 27, 1952), etc., or mixture of such sensitizers; antifoggants, such as ammonium chloroplatinate (A. P. H. Trivelli, et al., U.S. 2,566,245, granted Aug. 28, 1951), ammonium chloroplatinate (A. P. H. Trivelli, et al., U.S. 2,566,263, granted Aug. 28, 1951), benzotriazole,, nitrobenzimidazole, 5-nitroindazole, benzidine, mercaptans, etc. (see Mees, "The Theory of the Photographic Process," Macmillan Pub., 1942,, p. 460) or mixtures thereoff; hardeners, such as formaldehyde (A. Miller, U.S. 1,763,533, granted June 10, 1930), chrome alum (U.S. 1,763,533), glyoxal (J. Brunken U.S., 1,870,354, granted Aug. 9, 1932), dibromacrolein O. Block, et al., British 406,750, accepted Mar. 8, 1934), etc.; color couplers, such as those described in I. F. Salminen, et al.,, U.S. Pat. 2,423,730, granted July 7, 1947 Spence and Carroll, U.S. Pat. 2640,776, issued June 2, 1953, etc.; or mixtures of such addenda. Dispersing agents for color couplers, such as those set forth in U.S. patents to E. E. Jelley, et al., 2,322,027, granted June 15, 1943, and L. D. Mannes, et al., 2,304,940, granted Dec. 15, 1942, can also be employed in the above-described emulsions.

Although the invention has been described in detail with particular reference to preferred embodiments thereof, it will be understood that variations and modifications can be effected within the spirit and scope of the invention as described hereinbefore and as defined in the appended claims.

I claim:

1. A photographic silver halide emulsion which contains a compound having the formula:

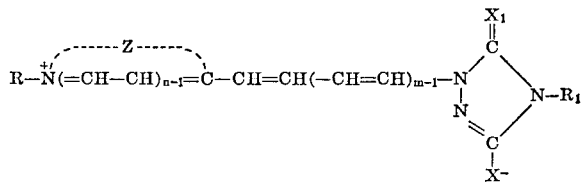

wherein $n$ and $m$ each represents a positive integer of from 1 to 2; R represents a member selected from the group consisting of an alkyl group, an hydroxyalkyl group, an alkoxyalkyl group, a carboxyalkyl group, a sulfatoalkyl group, an acyloxyalkyl group, an alkoxycarbonylalkyl group, an alkenyl group having 3 to 4 carbon atoms, an aralkyl group and a phenyl group; $R_1$ represents a phenyl group; $X^-$ and $X_1$ each represents a member selected from the group consisting of an oxygen atom and a sulfur atom; and Z represents a benzothiazole nucleus.

2. A photographic element comprising a support having coated thereon a photographic silver halide emulsion according to claim 1 wherein $X^-$ and $X_1$ in said formula each represents an oxygen atom.

3. A photographic element comprising a support having coated thereon a photographic silver halide emulsion according to claim 1 wherein $X^-$ and $X_1$ in said formula each represents a sulfur atom.

4. A photographic element comprising a support having coated thereon a photographic silver halide emulsion according to claim 1 wherein R in said formula represents an alkyl group.

5. A photographic element comprising a support having coated thereon a photographic silver halide emulsion according to claim 1 wherein said compound represented by said formula is anhydro-1-[2-(2-benzothiazolyl ethohydroxide)vinyl]-4-phenylurazole.

6. A photographic element comprising a support having coated thereon a photographic silver halide emulsion according to claim 1 wherein said compound represented by said formula is anhydro-1-[2-(2-benzothiazolyl ethohydroxide)vinyl]-4-phenyldithiourazole.

7. A photographic silver halide emulsion which contains the compound anhydro-1-[4-(2-benzothiazolyl ethohydroxide)-1,3-butadienyl]-4-phenylurazole.

References Cited
UNITED STATES PATENTS

| | | | |
|---|---|---|---|
| 2,961,317 | 11/1960 | Webster et al. | 96—130 |
| 3,287,135 | 11/1966 | Anderson et al. | 96—109 |
| 3,579,348 | 5/1971 | Fix et al. | 96—130 |

J. TRAVIS BROWN, Primary Examiner

U.S. Cl. X.R.

96—84; 260—240